(12) United States Patent
Schaffer et al.

(10) Patent No.: US 8,249,727 B2
(45) Date of Patent: Aug. 21, 2012

(54) CONTROL SYSTEM FOR INFLUENCING TEST-ENVIRONMENT PARAMETERS, METHOD FOR CONTROLLING A MICROSCOPE SYSTEM AND COMPUTER CONTROL PROGRAM FOR SAME

(75) Inventors: Jörg Schaffer, Göttingen (DE); Eugen Wehner, Göttingen (DE)

(73) Assignee: Carl Zeiss MicroImaging GmbH (DE)

( * ) Notice: Subject to any disclaimer, the term of this patent is extended or adjusted under 35 U.S.C. 154(b) by 145 days.

(21) Appl. No.: 11/857,866

(22) Filed: Sep. 19, 2007

(65) Prior Publication Data
US 2008/0071407 A1 Mar. 20, 2008

(30) Foreign Application Priority Data
Sep. 20, 2006 (DE) .......................... 10 2006 044 091

(51) Int. Cl.
*G06F 19/00* (2011.01)

(52) U.S. Cl. .......... 700/19; 700/108; 700/153; 700/299; 850/12; 850/14; 236/2; 236/103; 236/101 A; 236/12.11; 236/12.15; 236/44 C; 237/14; 359/395; 359/512; 359/820

(58) Field of Classification Search ................ 700/19, 700/108, 153, 299; 850/12.1, 12; 236/101, 236/101 A, 2, 12, 12.11, 44 C; 237/14; 359/395, 359/512, 820
See application file for complete search history.

(56) References Cited

U.S. PATENT DOCUMENTS

| | | | | |
|---|---|---|---|---|
| 4,149,591 A | * | 4/1979 | Albertsen | 165/165 |
| 4,356,967 A | * | 11/1982 | Lunick | 237/14 |
| 5,328,516 A | * | 7/1994 | Dietiker | 118/723 DC |
| 6,168,085 B1 | * | 1/2001 | Garcia | 236/44 C |
| 6,189,571 B1 | * | 2/2001 | Hedlund | 137/884 |
| 6,220,520 B1 | * | 4/2001 | Gibbs | 237/8 R |
| 6,741,136 B2 | * | 5/2004 | Seo | 331/74 |

(Continued)

FOREIGN PATENT DOCUMENTS

DE 197 56 510 C1 2/2000

(Continued)

OTHER PUBLICATIONS

Microsoft Corporation, "Microsoft Computer Dictionary", May 1, 2002, 5th edition, p. 96.*

(Continued)

*Primary Examiner* — Albert Decady
*Assistant Examiner* — Olvin Lopez Alvarez
(74) *Attorney, Agent, or Firm* — Mayback & Hoffman, P.A.; Gregory L. Mayback; Rebecca A. Tie

(57) ABSTRACT

A microscope configuration according to an exemplary embodiment includes a microscope system with at least one addressable component and also a control system with a plurality of control modules for influencing a plurality of test-environment parameters in a test chamber of the microscope system. The control modules are configured to be combined in modular manner and to be coupled through an interface unit with a unified bus, through which they are controlled. A control module influencing a test-environment parameter of an incubation system has a control command interface unit configured to receive at least one control command. The control command interface unit couples with a bus. A control device is coupled with the control command interface unit and influences the test-environment parameter based upon the control command. A further interface unit is coupled to the control command interface unit and outputs, again, the received control command.

26 Claims, 4 Drawing Sheets

U.S. PATENT DOCUMENTS

| | | | |
|---|---|---|---|
| 7,171,985 B2 * | 2/2007 | Eltrop | 137/884 |
| 7,191,800 B2 * | 3/2007 | Berner et al. | 137/884 |
| 7,311,138 B2 * | 12/2007 | Kazari et al. | 165/153 |
| 7,408,775 B2 * | 8/2008 | Walz et al. | 361/699 |
| 2002/0020451 A1 * | 2/2002 | Reid et al. | 137/884 |
| 2004/0045624 A1 * | 3/2004 | Elwood et al. | 141/4 |
| 2004/0196003 A1 * | 10/2004 | Graff et al. | 320/116 |
| 2004/0253742 A1 * | 12/2004 | Affleck et al. | 436/165 |
| 2005/0051723 A1 | 3/2005 | Neagle et al. | |
| 2005/0066104 A1 * | 3/2005 | Train et al. | 710/305 |
| 2005/0121530 A1 * | 6/2005 | Song | 236/44 C |
| 2005/0282268 A1 * | 12/2005 | Kagayama | 435/288.7 |
| 2006/0011240 A1 * | 1/2006 | Berner et al. | 137/554 |
| 2006/0092506 A1 | 5/2006 | Tsuchiya et al. | |
| 2006/0194193 A1 * | 8/2006 | Tsuruta et al. | 435/4 |
| 2008/0097143 A1 * | 4/2008 | Califorrniaa | 600/22 |
| 2008/0291534 A1 * | 11/2008 | Okugawa | 359/395 |
| 2011/0073109 A1 * | 3/2011 | Mayer et al. | 128/203.26 |

FOREIGN PATENT DOCUMENTS

| | | |
|---|---|---|
| DE | 199 36 572 B4 | 5/2005 |
| DE | 10 2005 023 855 A1 | 1/2006 |
| JP | 04-063586 | 2/1992 |
| JP | 2003-504640 | 12/2001 |
| JP | 2003-283502 | 10/2003 |
| WO | WO 2004/069409 A2 | 8/2004 |
| WO | WO 2007/014727 A2 | 2/2007 |

OTHER PUBLICATIONS http://www.computer-dictionary-online.org/index.asp?q=bus, "computer dictionary", Mar. 2000, p. 1.*

Weighing-Systems.com "Fieldbus overview", "http://www.weighing-systems.com/TechnologyCentre/fieldbus1.html", 2010, pp. 1-3.*

ABB Modbus and M DDE Server, 2003, pp. 1-16.*

ABB "AO2000 Modbus and AO MDDE" 2003, pp. 1-26.*

Carl Zeiss, "Cell Observer", Jan. 2000, http://www.zeiss.de/C1256D18002CC306/0/7CD7EF9113DAC9EDC1256D5900335198/$file/40-714_e.pdf, pp. 1-8.*

Carl Zeiss, "Cells need the perfect Climate", Feb. 2008, pp. 1-42.*

Zeiss, manual for Tempcontrol 37-2 digital, Oct. 2002, pp. 10.*

PECON, "Manual Incubator BL", Nov. 2005, pp. 22.*

Pecon, "manual CTI controller 3700", Mar. 2, 2004, pp. 14.*

ImageXpress 5000A System of the company Molecular Devices Corporation in Sunnivale, California, USA.

Incubatix 35 of the company Linkham Scientific, print from www.labonline.com/products/7539-Thermal-chambers-for-cell-microbiology.

Bio-Station IM of the company Nikon Corporation, Kawasaki.

* cited by examiner

CONTROL SYSTEM FOR INFLUENCING TEST-ENVIRONMENT PARAMETERS, METHOD FOR CONTROLLING A MICROSCOPE SYSTEM AND COMPUTER CONTROL PROGRAM FOR SAME

CROSS REFERENCE TO RELATED APPLICATION

This application claims the priority, under 35 U.S.C. Section 119, of co-pending German Published, Non-Prosecuted Patent Application No. 10 2006 004 091.9, filed Sep. 20, 2006, the prior application is herewith incorporated by reference herein in its entirety.

FIELD OF THE INVENTION

The present invention relates to a control module and control system for influencing test-environment parameters of, e.g., an incubation system, to a process for controlling a microscope arrangement, and also to a computer-program product. In particular, the present invention relates to appliances and processes of such a type with which a test-environment parameter in a test chamber of a microscope system can be influenced.

BACKGROUND OF THE INVENTION

For the purpose of observing biological test material, such as cell cultures for example, microscope systems can be combined with incubation systems, the incubation system serving to monitor one or more parameters of an environment of the test material, and consequently to monitor the conditions for the test material. Examples of test-environment parameters of such a type to be monitored include an oxygen content, a carbon-dioxide content, an air humidity and a temperature of the atmosphere surrounding the specimen. One advantage of such a monitoring of test-environment parameters consists in the fact that conditions are established that are suitable for a relatively long survival of the biological test material, in turn enabling a relatively long observation of the specimen, and/or in the fact that experiments can be carried out with which the reaction of the biological test material to particular environmental influences can be investigated selectively.

For the purpose of influencing or controlling environmental parameters of a specimen pertaining to a microscope system, control instruments are known with which an individual test-environment parameter, or typically several test-environment parameters, is/are monitored or controlled. However, such control instruments are conventionally configured so that they can be operated manually, for which purpose keypads, rotary knobs or similar devices are provided, via which a user sets the test-environment parameter. One disadvantage associated with such conventional control instruments lie in the fact that a human user has to become active to change a test-environment parameter and also, possibly, to log the current value of the test-environment parameter, which may be important for a later evaluation of the data material acquired with the microscope system. An extensive automation of experimental sequences is not guaranteed with such conventional control instruments.

A further disadvantage of conventional control instruments for influencing test-environment parameters consists in the fact that they are frequently configured in order to control several test-environment parameters simultaneously—i.e. they have several control variables. This combination of several control functions in a single control instrument frequently has the effect that the control instrument can only be used for incubation systems with a particular incubator size, so that for differing incubation systems a user has to use different control instruments.

There is a need in the art to provide improved appliances and methods for influencing test-environment parameters in an incubation system. In particular, there is a need for appliances and methods for an incubation system that can be used as a constituent of a microscope arrangement, said appliances and methods enabling an extensive automation of experimental sequences. Furthermore, there is a need for appliances and methods that can be used for incubation systems with incubators of various sizes.

Other features that are considered as characteristic for the invention are set forth in the appended claims. Although the invention is illustrated and described herein as embodiment in a control system for influencing test-environment parameters, a method for controlling a microscope system and computer control program for same, it is, nevertheless, not intended to be limited to the details shown because various modifications and structural changes may be made therein without departing from the spirit of the invention and within the scope and range of equivalents of the claims. The construction and method of operation of the invention, however, together with additional objects and advantages thereof, will be best understood from the following description of specification embodiments when read in connection with the accompanying drawings.

BRIEF SUMMARY OF THE INVENTION

A control module according to one embodiment of the invention for influencing a test-environment parameter of an incubation system comprises an interface unit, which in use is to be coupled with a bus, for receiving a control command, a control device, which is coupled with the interface unit and is configured to influence the test-environment parameter in a manner depending on the control command, and a further interface unit which is coupled with the interface unit and via which the received control command is output again. This control module can be controlled, by a computer system for example, via the interface unit, enabling an automation of an experimental sequence, in which case, by virtue of the fact that a further interface unit is provided for the purpose of outputting the control command again, a portion of the bus system, via which the control module is controlled, takes the form of an integrated constituent of the control module. This modular configuration allows various control modules to be combined with each other.

The control device may be configured to evaluate the control command, to the effect that it ascertains whether the control command is addressed to the control module. Only if the control command is addressed to the control module does the control device become active in accordance with the control command, in order to influence the test-environment parameter. As a result, it becomes possible for a plurality of control modules of such a type to be linked up with one another so as to form a bus system and to be controlled via a unified bus protocol.

The term 'unified bus protocol' in this connection is understood to mean a bus protocol with which the control modules can be controlled in a unified manner at the application layer—i.e. on the uppermost layer according to the OSI reference model.

The control command may contain a set value for the test-environment parameter, which is ascertained by the control device and stored in a memory. The test-environment parameter is then influenced by the control device in such a manner that it attains the set value or a value close to the set value. An actual value of the test-environment parameter, which is ascertained by a sensor in a test environment or in the control module, can also, for example, be saved in the memory. The actual value can be output via the interface unit, enabling a logging of the experimental sequence, for example by means of a computer.

The test-environment parameter may be, for example, a parameter of an atmosphere surrounding the specimen, such as, for example, an oxygen content, a carbon-dioxide content, an air humidity or an air temperature of the air surrounding the specimen. The test-environment parameter may also be, for example, the temperature of a specimen-holder. In the former case, in which the test-environment parameter is a parameter of the atmosphere surrounding the specimen, the control module may, in particular, include an air outlet for emitting a stream of air to be conducted into a test environment, and also an air inlet, the stream of air being guided from the air inlet to the air outlet through the control module and being influenced there. In order to allow various control modules of such a type to be combined easily, the air inlet and the air outlet may be configured in such a manner that an air connection for the air to be conducted into the test environment can easily be established by side faces of various control modules being brought into contact with one another. In particular, for this purpose the air inlet and the air outlet may be provided on opposite sides of a housing of the control module, and the air inlet and the air outlet may have complementary connecting portions, so that the air inlet of one control module can be directly brought into engagement with the air outlet of another, identically formed, control module. Similarly, the interface unit and the further interface unit may also be formed in such a manner that the interface unit of one control module can be directly coupled with the further interface unit of another control module, by the control module and the other control module being brought into contact with one another at side faces of the same, for example by the control module and the further control module being stacked on top of one another or arranged alongside one another.

A control system according to an exemplary embodiment of the invention for influencing a plurality of test-environment parameters of an incubation system comprises a bus for transmitting a control command, a plurality of control modules with, in each instance, an interface unit, coupled with the bus, for receiving the control command, each control module of the plurality of control modules including a control device coupled with the respective interface unit. The control device is respectively configured to influence one of the plurality of test-environment parameters in a manner depending on the control command. This control system enables a plurality of control modules to be controlled and hence a plurality of test-environment parameters to be influenced via a single bus with which the control modules are coupled. The control device of each control module may be configured to evaluate the control command and in this way to ascertain whether the control command is addressed to the associated control module. The control modules may, in particular, be configured as control modules having two interface units, as described above. The control modules may be stacked on top of one another or arranged laterally alongside one another, in order in this way to form the control system.

A control module or several control modules of the control system may be configured to store an actual value of the respective test-environment parameter from a sensor which is provided in a test environment or in the control module, in which connection the function of the respective control module can be adapted in a manner depending on the actual value.

As already stated above, a portion of a bus may take the form of an integrated constituent of the control module. An electrical coupling between various control modules of the control system, which is necessary for the purpose of forwarding the control command, may be established by virtue of the fact that the interface unit or the further interface unit of two adjacent control modules of the control system are coupled by side faces of the adjacent control modules being brought into contact with one another, for example by the control modules being stacked on top of one another or arranged in series alongside one another.

If several or all of the control modules of the control system influence test-environment parameters by influencing air to be conducted into a test environment, furthermore an air connection between adjacent control modules may also be established by the latter being stacked on top of one another or arranged side by side. Alternatively, however, use may also be made of separate air-connection pieces, for example in the form of hoses, in order to enable an exchange of air between various control modules.

The control variables of the plurality of control modules may be different in pairs—i.e. the control variable of any control module of the plurality of control modules is different from the control variables of all the other control modules.

The bus may be a serial bus, in which case a bus protocol of the bus may be selected from a group comprising a CAN protocol, an RS232 protocol and a USB protocol. However, the bus may also be a parallel bus.

The control system can be combined with a microscope system so as to form a microscope arrangement. In this case the control system influences a plurality of test-environment parameters in a test chamber in which a specimen to be observed with the microscope system is to be accommodated. If the microscope system likewise includes an addressable component, the latter may be coupled via an interface unit with the bus with which the control modules of the control system are also coupled. As a result, it becomes possible to drive both the addressable component of the microscope system and each of the control modules of the control system via the bus. Furthermore, the control commands may be output by an electronic computer system via the bus, so that both the addressable component of the microscope system and the various control modules can be controlled with the aid of the electronic computer system. The control modules may, in turn, be configured to store an actual value of the test-environment parameter ascertained in a test environment or in the control module with a sensor, in which case the function of the control module can be adapted in a manner depending on the actual value. With this microscope arrangement, the communication between the various components involved—i.e. the electronic computer system, the microscope system and the control system for influencing test-environment parameters—is consequently realized by means of a unified bus system. This enables, in particular, a unified control both of the microscope system and of the control system by the electronic computer system via the bus, as well as an automatic logging by the electronic computer system of various data relevant to an experimental schedule.

It should be understood that not only a control system with a plurality of control modules but also a single control module in combination with a microscope system can be driven via a unified bus system.

In accordance with an exemplary embodiment of the invention, there is also provided a method of controlling a microscope configuration with a microscope system that has an addressable component and with a control module for influencing a test-environment parameter of a test chamber of the microscope system with an electronic computer system. The method includes generation of a microscope control command for controlling the addressable component of the microscope system, the microscope control command being provided with address information for the addressable component. The process further includes generation of a module control command for controlling the control module, the module control command being provided with address information for the control module. The microscope control command and the module control command are output in order to control the addressable component and the control module. Through the addition to the respective control command of the address information for the addressable component or for the control module, it becomes possible to control the addressable component of the microscope system and the control module via a unified bus system. In this connection, the term "address information" denotes any type of information that permits the control module or the addressable component to be identified, for example, in the form of a hardware identification code which is stored in the form of a numeric string in the control module or in the addressable component.

The module control command may, in particular, include a set value for the test-environment parameter, which is consequently written to the control module via the bus system. The module control command and/or the microscope control command may be generated automatically, depending on a time-phased schedule and on a monitored elapsed time, in order in this way to conduct an experimental schedule automatically. The process may further include various data-evaluation and logging functions, such as, for example, a storage of an actual value of the test-environment parameter as a function of the elapsed time by means of the electronic computer system, or a storage of image data that were recorded with the microscope system.

A computer-program product according to an exemplary embodiment of the invention includes instructions that are configured in such a way that in the course of their execution by an electronic computer system the electronic computer system executes the above-described method of controlling a microscope arrangement. In the course of their execution by the electronic computer system, the instructions of the computer-program product may enable a user to drive, with a unified operator interface, both the microscope system with the addressable component and the control module for influencing the test-environment parameter.

The control module and the control system may find application in any incubation system in which a test-environment parameter or several test-environment parameters are to be controlled. The control module and the control system may, however, be used in particular in combination with a microscope system, in order to control in a defined manner a test-environment parameter or several test-environment parameters of a specimen that is to be observed with the microscope system. Fields of application of the method and of the computer-program product include microscopic observations, in the course of which an automation of the observational schedule or experimental schedule is desirable.

Exemplary embodiments of the invention will be described in detail below with reference to the Figures.

Figure 1:
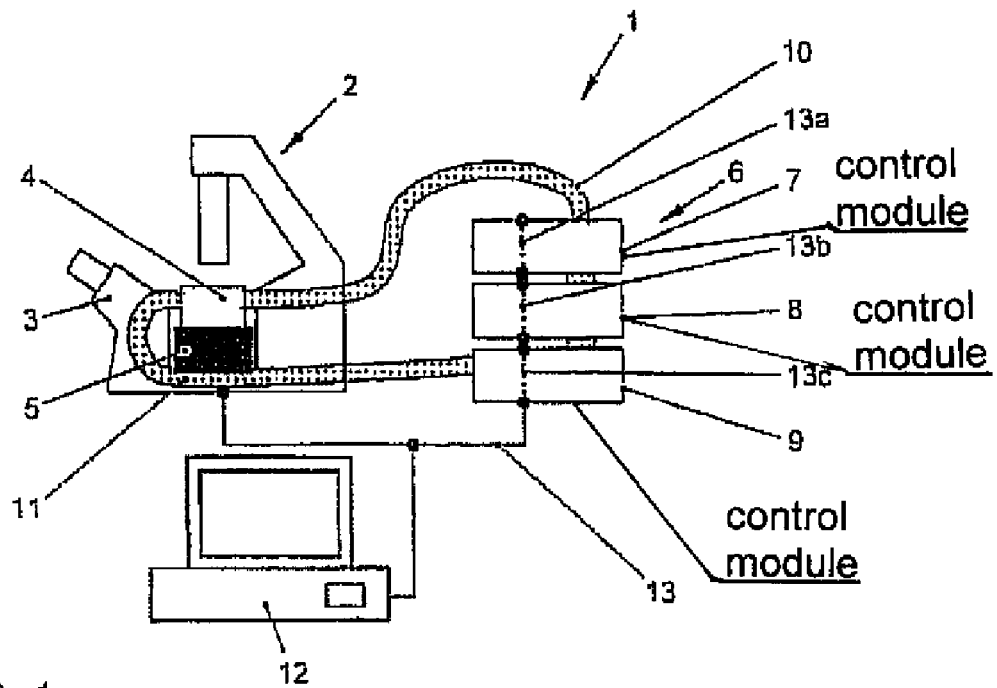
FIG. 1 is a diagrammatic representation of a microscope configuration that includes a control system according to an exemplary embodiment of the present invention.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. It must be noted that, as used in the specification and the appended claims, the singular forms "a," "an," and "the" include plural references unless the context clearly dictates otherwise.

While the specification concludes with claim defining the features of the invention that are regarded as novel, it is believed that the invention will be better understood from a consideration of the following description in conjunction with the drawing figures.

FIG. 1 shows a microscope arrangement 1 according to one embodiment of the invention which comprises a microscope system 2 and a control system 6 for influencing a plurality of test-environment parameters for a specimen to be observed with the microscope system 2. The microscope system 2 includes a microscope 3 which may have all the standard components of a microscope and which is used for observing a specimen in a test chamber 4. The microscope system 2 further includes at least one addressable component 5. The addressable component 5 may, for example, include a microscope stage, capable of being displaced by a motor, for positioning the specimen in three directions in space, a device for specimen manipulation, such as perfusion for example, optical or mechanical forceps, a device for supplying active substances etc., or an illumination device for illuminating the specimen to be observed, whereby, for example, the spectrum or the intensity of the illumination device can be controlled and changed. The addressable component 5 may also be or include a device for image-recording, such as, for example, a camera which can be tripped by an electrical signal. If a plurality of addressable components are provided on the microscope system, these may be controlled simultaneously or sequentially.

The control system 6 serves for controlling a plurality of parameters in the test chamber 4. The control system 6, which includes a plurality of control modules 7-9 which will be explained in detail below, is connected to the test chamber 4 via a pair of air lines 10, 11, and, together with the test chamber 4 and the air lines 10, 11, forms an incubation system. Each control module 7-9 of the control system 6 controls a parameter of the test environment in the test chamber 4. Possible test-environment parameters include, for example, an oxygen content, a carbon-dioxide content, an air humidity and an air temperature of the air in the test chamber 4, or a temperature of a test stage or of a specimen-holder configuration, of a heating element for the objective or of test chambers. The test-environment parameters that relate to the atmosphere surrounding the specimen are controlled by the control system 6 by guiding air into the test chamber 4 by the control system 6 via the air line 10 and flowing around the specimen there. At the same time, air is aspirated out of the test chamber 4 by the control system 6 via the air line 11 and is reprocessed. As indicated in FIG. 1, the air is conveyed between control module 9 and control module 8 and also between control module 8 and control module 7, in each instance via corresponding air-line connecting pieces. In each of the control modules 7-9, a parameter of the air to be conducted into the test chamber 4 is respectively adjusted, to realize desired, defined conditions in the test chamber 4. The control modules are preferably arranged in such a manner in the direction of flow of the air flowing in the test chamber 4 that a variable that is set by one of the control modules is not influenced, or is barely influenced, by the following control modules. For instance, control module 9 may be a control module for controlling the carbon-dioxide content, control module 8 may be a control module for controlling the oxygen content, and control module 7 may be a control module for controlling the air temperature. Each control variable is set in the control system 6 by only one control module 7-9—i.e. the control variables of the control modules 7-9 are different from one another in pairs, and there is no redundancy.

Both the addressable component 5 of the microscope system 2 and the control modules 7-9 of the control system 6 are driven by an electronic computer system 12, for example in the form of a conventional computer or a separate electronic operating unit. For this purpose, the addressable component 5 of the microscope system 2, the control system 6 and the computer 12 are connected to a common bus system 13, by virtue of which it becomes possible for the communication between the various components involved to be handled via a unified bus system and a unified bus protocol. The bus protocol may be any suitable bus protocol, for example a CAN protocol, an RS232 protocol or a USB protocol. Both the microscope system 2 and the control system 6 have corresponding interfaces. As already mentioned above, in this connection the term 'unified bus protocol' denotes a bus protocol under which the control modules are driven in unified manner at the application layer.

As represented schematically in FIG. 1, portions 13a-13c of the bus 13 take the form of integrated constituents of the control modules 7-9—i.e. the control modules 7-9 are respectively configured to output a signal received at an interface again, to another of the control modules, via a further interface. In this way, in particular a serial bus architecture, but also a parallel bus architecture, may be formed. As will be explained in greater detail in the following, the control modules 7-9 may be configured in such a manner that the electrical coupling which is necessary between the interfaces of various control modules is established automatically if the control modules 7-9 are stacked one on top of the other, as shown in FIG. 1. Similarly, the air connections between the control modules are also established automatically if the latter are stacked on top of one another.

Figure 2:
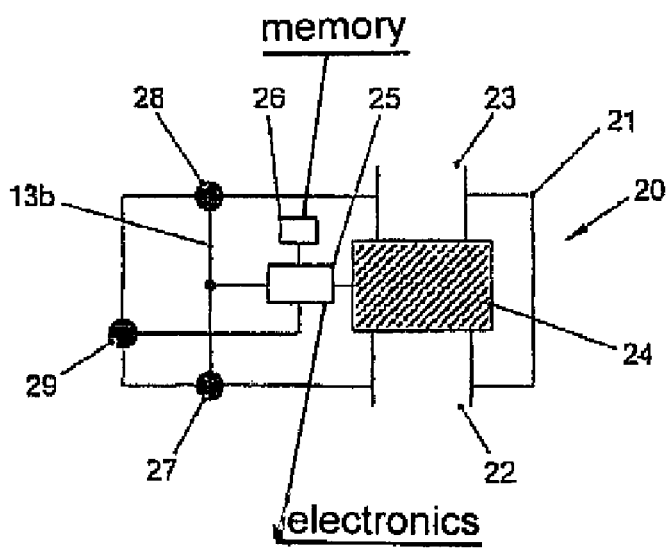
FIG. 2 is a diagrammatic representation of a control module according to an exemplary embodiment of the invention.

With reference to FIG. 2, a control module according to an exemplary embodiment of the invention will next be explained in greater detail. The control module 20, which is only represented schematically in FIG. 2, may, for example, be used by way of control module 7 or 8 of the control system 6 shown in FIG. 1.

The control module 20 includes a housing 21 in which an air inlet 22 is formed on a lower side face, and an air outlet 23 is formed on an upper side face. The air inlet 22 and the air outlet 23 serve respectively for receiving and for outputting the air that is to be conducted into the test chamber of the microscope system 4. The air inlet 22 and the air outlet 23 are connected to a conduit in the control module 20, so that the air is guided through the control module from the air inlet 22 to the air outlet 23. At the conduit for the air, a device 24 for influencing a parameter of the air is provided. The configuration and mode of operation of the device 24 depends on the variable to be influenced by the control module 20 or may, for example, include a heating element or several heating elements if the control module serves for controlling the air temperature, or may include a valve if the control module serves for controlling the oxygen content or the carbon-dioxide content of the air. In the latter case, containers, which are typically provided outside the control module 20, for the corresponding gas—nitrogen for displacing oxygen, or carbon dioxide—are provided, from which nitrogen or carbon dioxide can be fed into the stream of air flowing through the control module 20. The device 24 is coupled with control-module electronics 25 which, in turn, are connected to a control-module memory 26. Saved in the memory 26 is a set value for the test-environment parameter to be controlled by the control module 20, which is read out by the control-module electronics 25 which, in turn, drive the device 24 in a manner depending on the set value. The set value is communicated to the control module 20 in the form of a corresponding control command via the bus 13. The control-module electronics 25 are connected to the interface 27 which is to be coupled with the bus 13 in order to evaluate the control command received via this interface 27. For a bus architecture as represented in FIG. 1, the control command includes address information that identifies the control module to which the control command is directed and that is to be actuated on the basis of the control command. The control-module electronics 25 are configured to read out the address information from the control command and in this way to ascertain whether the control command is intended for the control module 20. In this case only, the control command is subjected to further processing, the set value for the test-environment parameter transmitted with the control command is ascertained, and is saved in the control-module memory 26.

As already mentioned above with reference to FIG. 1, the bus 13 is connected through the control module 20. For this purpose, the control module 20 includes a further interface unit 28 which is coupled with the interface unit 27 and via which a signal received via the interface unit 27 is transmitted to the next control module.

The control module 20 has a further port 29 which is coupled with the control-module electronics 25 and serves to receive a signal from a sensor provided in the test chamber 4 of the microscope system 2. This signal—which, for example, may be a simple voltage signal—corresponds to the actual value of the test-environment parameter to be controlled by the control module 20. This actual value is likewise stored in the control-module memory 26. In response to a corresponding enquiry addressed to the control module 20, which is received in the form of a command via the interface 27, the control-module electronics 25 read out the actual value from the control-module memory 26 and communicate said value to the computer 12 via the interface 27 and the bus system 13. In this way, it becomes possible to log the actual values in the test chamber automatically by means of the computer 12. The sensor port 29, however, does not necessarily have to be provided in the control module 20. In particular, it is also possible to connect sensors in the test chamber 4 to the computer 12 in some other way, for example via an interface of the microscope system. As will be explained in further detail below, sensors may also be integrated within the control modules.

Figure 3:
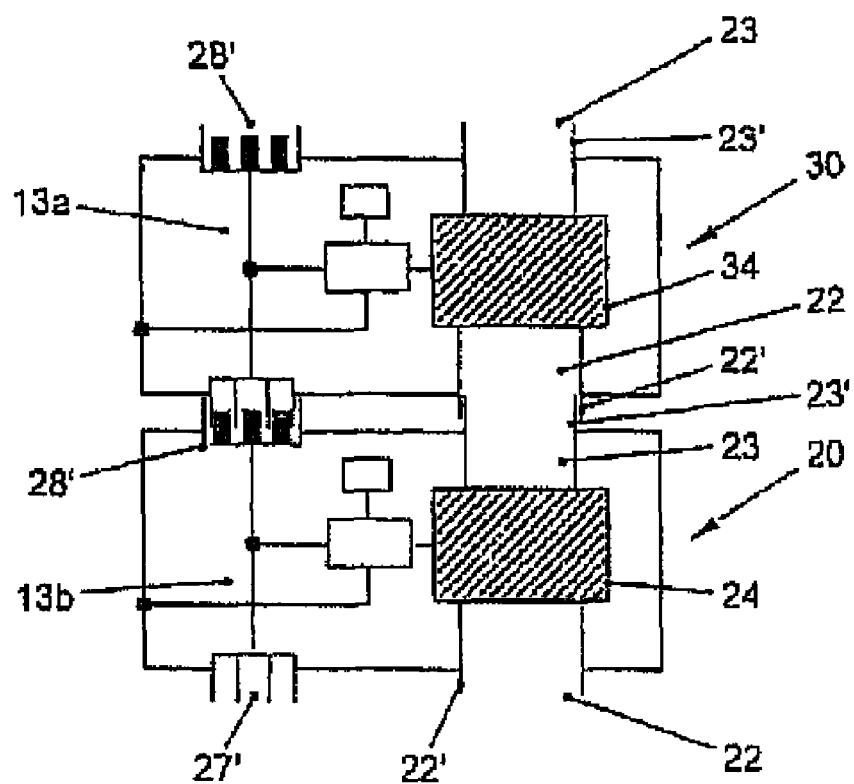
FIG. 3 is a diagrammatic representation of a combination of several control modules as shown in FIG. 2 forming an exemplary control system according to an exemplary embodiment of the invention.

With reference to FIG. 3, the combination of various control modules 20, 30 so as to form a control system will next be explained. The structure of control module 30 is substantially identical to the structure of control module 20 explained with reference to FIG. 2, but exhibits a different device 34 by which the air flowing through control module 30 is influenced, since control module 30 controls a test-environment parameter different from that controlled by control module 20.

In order to combine several control modules 20, 30 so as to form a control system, electrical connections may need to be established between the interface unit or the further interface unit of the control modules 20, 30 and the air inlet or air outlet of these control modules 20, 30. Whereas connections of such a type may also be realized by means of suitable cables or air lines, the control module shown in FIG. 2 is configured in such a manner that the corresponding connections are established automatically if the control modules 20, 30 are stacked on top of one another, as will be explained in the following. For the purpose of better illustration, the interface units 27' or the further interface units 28' of the control modules 20, 30 have been exemplarily represented not only schematically but in the form of plug-in connections. The interface unit 27' and the further interface unit 28' of each of the control modules 20, 30 are in this case configured as complementary connectors, so that the further interface unit 28' of one of the control modules is capable of being coupled directly with the interface unit 27' of another control module. For instance, the interface unit 27' may be configured as a male RS232 connector, and the interface unit 28' may be configured as a female RS232 connector. Similarly, the air inlet 22 and the air outlet 23 of each control module 20, 30 also have a complementary configuration. In FIG. 3 the connecting portions 22' and 23' of the air inlet 22 and of the air outlet 23, respectively, protruding from the respective housing of the control module 20, 30 are configured in such a manner that the connecting portion 22' of the air inlet 22 is capable of being connected to a connecting portion 23' of the air outlet 23 of a control module with identical configuration of the air inlet and air outlet. In the example represented in FIG. 3 the connecting portion 23' of the air outlet 23 of the control module 20 can be introduced in sealing manner into the connecting portion 22' of the air inlet 22 of the control module 30. By virtue of this structural design of the control modules 20, 30 an air connection is established automatically between the air conduits of the control modules, and an electrical connection is established automatically between the portions of the bus 13 extending within the control modules. The positioning of the control modules 20, 30 relative to one another may in this case be assisted by guide devices (not shown) such as, for example, pins or recesses in the upper or lower side faces of the control modules 20, 30.

In a control system that includes a plurality of control modules, each control module does not have to be configured as described above. In particular, in the case of stacking control modules one on top of the other it is desirable for the air inlet 22 and the interface 27 of the lowest control module of the control system to be provided, not on the lower side face, but on a more readily accessible lateral side face. As represented schematically in FIG. 1, this can be realized, for example, by providing the air inlet 22 and the interface unit 27 on a lateral side face of the housing of the control module.

Whereas in the exemplary embodiment shown in FIGS. 1-3 the control modules have been configured in such a way that they are stackable, the corresponding electrical connections and air connections being established automatically by virtue of the stacking, in another exemplary embodiment the control modules may also be configured in such a way that the air inlet 22 and the interface unit 27 are provided on a lateral side face, for example on the left side face, of the housing, and the air outlet 23 and the further interface unit 28 are provided on the other lateral side face, for example on the right side face. In this case the corresponding electrical connections and air connections may be established automatically if the control modules are arranged laterally side by side.

Although not shown in FIGS. 2 and 3, it will be understood that the control module 20 may include further components, such as, for example, an internal sensor for ascertaining one or more parameters of the air, which is coupled with the control-module electronics 25, the actuation of the device 24 being effected in a manner depending on a value ascertained by the internal sensor. For instance, the sensor may ascertain the temperature of the air flowing in at the air inlet 22, and a heating power of the device 24 may be set in a manner depending on this input temperature, in order to achieve a desired output temperature for the air.

Figure 4:
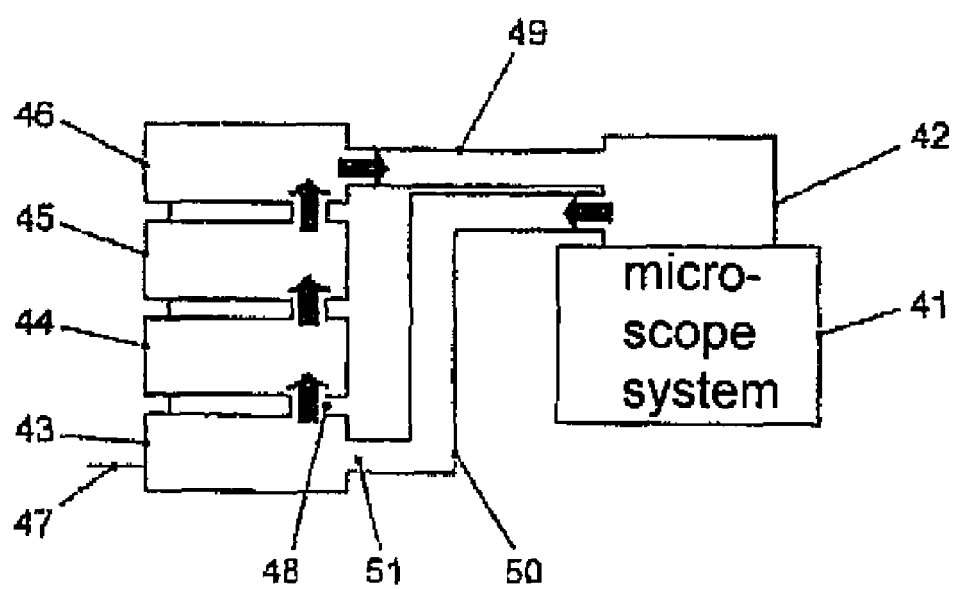
FIG. 4 is a diagrammatic representation for illustrating a stream of air in a microscope configuration according to a further exemplary embodiment of the invention.
Figure 5A:
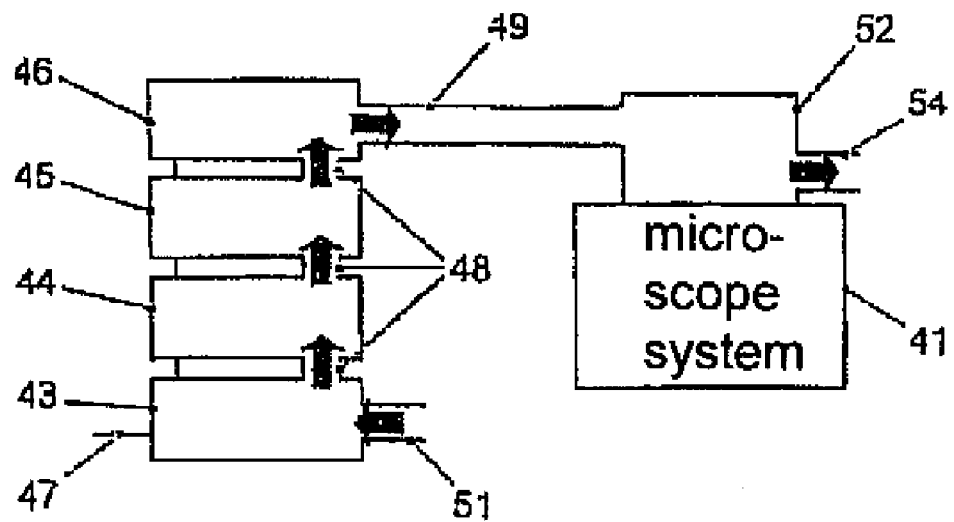
FIGS. 5A and 5B are diagrammatic representations for illustrating a stream of air in a microscope configuration according to yet further exemplary embodiments of the invention.
Figure 5B:
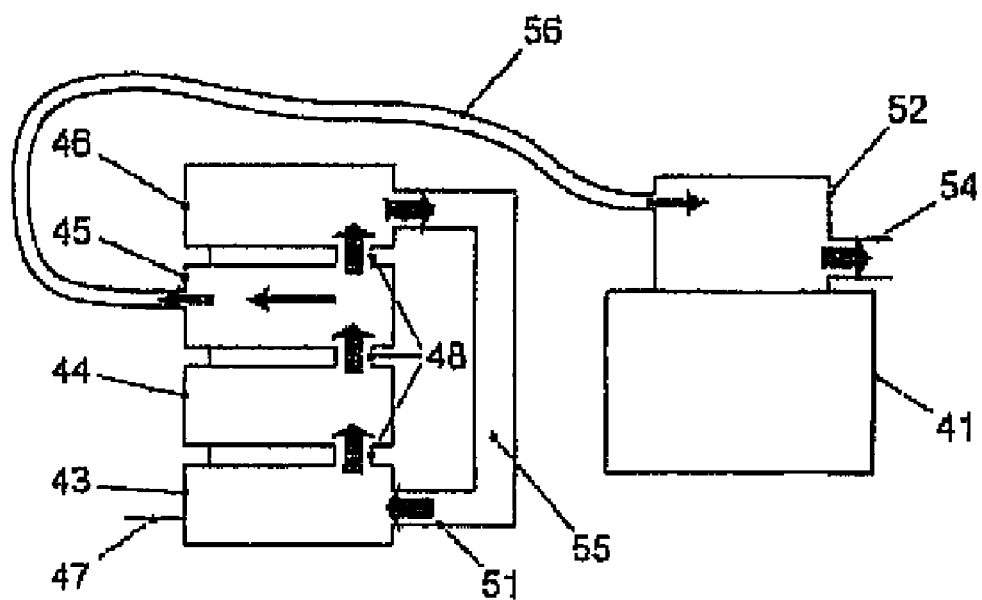

With reference to FIG. 4 and FIGS. 5A and 5B, various ways of guiding air between the control modules of the control system and the test chamber of the microscope system will next be described. Identical or similar elements have been provided with the same reference symbols in FIGS. 4, 5A and 5B. Represented schematically is a microscope system 41 with a test chamber 42, and also a control system with a plurality of control modules 43-46. As already described above, the control modules are controlled, e.g., by a computer or an operating unit via a bus 47. Air is guided between the control modules 43-46 via air-connection portions 48 which are only indicated schematically, the airflow direction being indicated schematically by arrows. In the exemplary embodiment represented in FIG. 4, in which the flow of the air is substantially identical to the exemplary embodiment shown in FIG. 1, the air to be conducted into the test environment is conducted into the test chamber 42 through control module 46 via an air connection 49. At the same time, air from the test chamber 42 is aspirated via an air line 50 into control module 43 which has a suction opening 51 for the air from the test chamber 42. The aspirated air then passes through the air conduits in the control modules 43-46, where the various parameters of the air, such as, for example, its temperature, its humidity, its oxygen content or its carbon-dioxide content, is influenced in accordance with the corresponding function of the control modules. The air is subsequently supplied to the test chamber 42 again via the air line 49. FIG. 4 is consequently an example of a circulating airflow.

In the exemplary embodiment shown in FIG. 5A the suction opening 51 of control module 43 is not connected to the test chamber via an air line. Rather, control module 43 aspirates fresh air at the suction opening 51, said air subsequently being guided through the control modules 43-46, whereby, in turn, the parameters of the air are influenced or controlled in each instance in a manner corresponding to the control functions of the individual control modules. After passing through all the control modules, the air is guided from control module 46 to a test chamber 52 via the air line 49. In the exemplary embodiment shown in FIG. 5A the test chamber 52 has no opening through which the air would be supplied from the test chamber 52 to the control modules again. Rather, the test chamber 52 includes an outlet opening 54 through which air from the test chamber 52 is blown out into the environment.

Although the exit opening 54 in FIG. 5A has been represented as an opening in the wall of the test chamber 52, it may also be configured in another way, for example by a cover which upwardly seals the test chamber 52 resting only loosely on the side walls of the test chamber, so that in the case of an excess pressure in the test chamber 52 the cover is lifted minimally and air is consequently able to escape passively.

FIG. 5B shows a further exemplary embodiment which is a modification of the exemplary embodiment shown in FIG. 5A and in which a stream of air is conducted in circulating manner through all the control modules 43-46. For this purpose, the outflow opening of control module 46 is connected to the suction opening 51 of control module 43 via an air line 55. A small partial stream of air, which has been represented schematically by smaller arrows, is branched off in control module 45 from the circulating stream of air and guided to the test chamber 52 via the air line 56. Fresh air or gases can be aspirated via suction openings (not represented) in the control modules, in order to keep the total quantity of the air circulating through the control modules approximately constant.

It should be observed that, whereas in the exemplary embodiments shown in FIGS. 1, 4, 5A and 5B the air to be conducted into the test chamber is guided through all the control modules, in other embodiments the air may be guided through only some or only one of the control modules of the control system. For instance, one of the control modules may have been set up in order to control a specimen-holder temperature in the test chamber. To do this, it is not necessary to cause the air that is to be conducted into the test chamber to flow through this control module.

As has already been explained above, the control system—and, in particular, also each individual control module—may be configured to be controlled together with the addressable component of the microscope system via a unified bus system. The controlling of the various components, in particular of the addressable component 5 of the microscope system 2 and also of the control modules 7-9 of the control system 6, may be effected in this case by means of the computer 12, which has been programmed to drive these components automatically. A sequence of instructions to be processed by the computer, which are stored on a storage medium in the form of a computer-program product, may then offer a unified operator interface which enables both the control of the control system and of the addressable component of the microscope system and a documentation of various experimental parameters and the control of an image-recording by the microscope system to be performed. By virtue of the fact that both the various control modules of the control system for influencing test-environment parameters and one or possibly even more addressable components of a microscope system may be controlled by the computer 12 under a unified operator interface, it becomes possible to match complex sequences optimally to one another during the course of an experiment.

Figure 6:
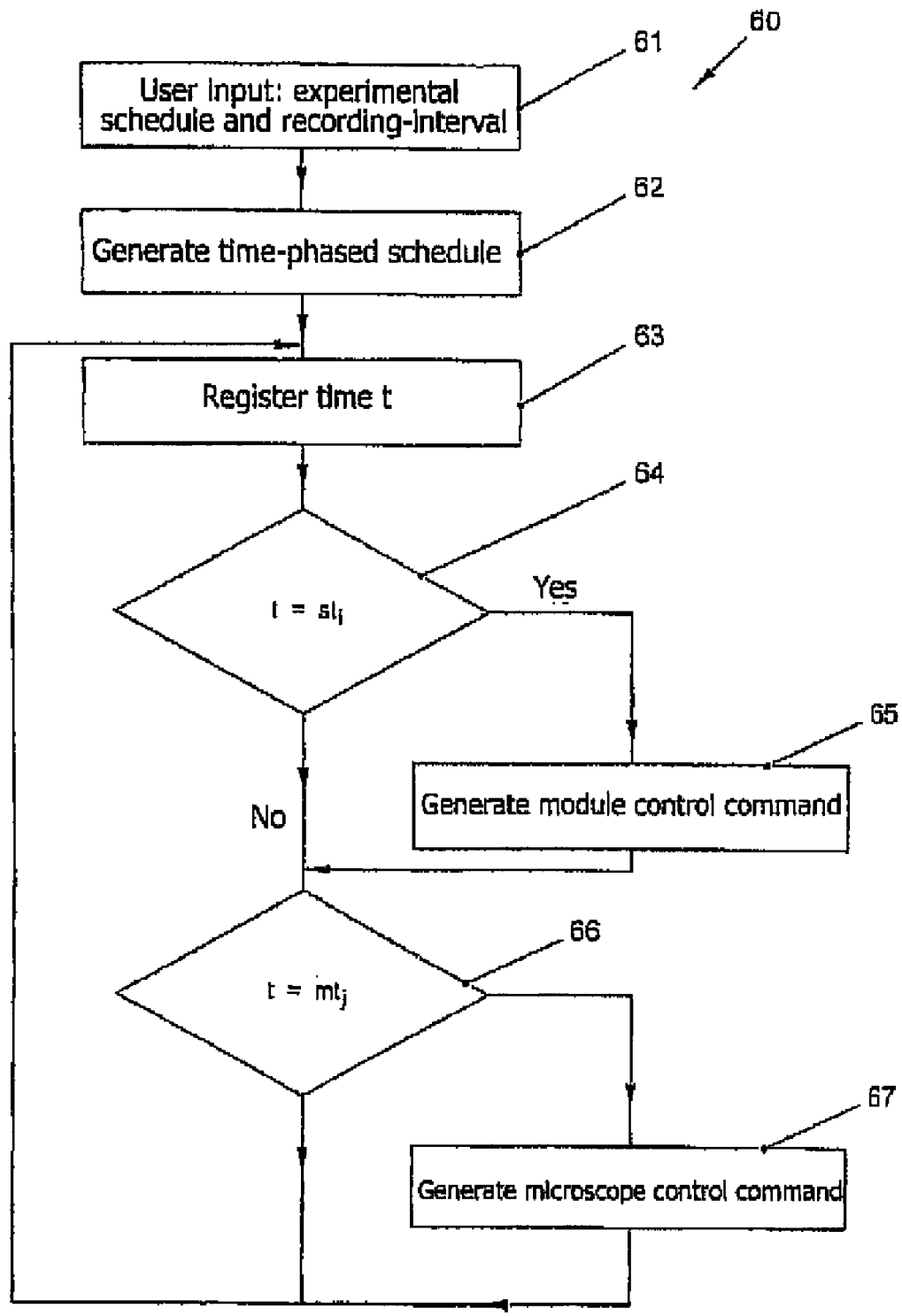
FIG. 6 is a flow-chart representation for a process according to an exemplary embodiment of the invention.

With reference to FIG. 6, a method 60 according to an exemplary embodiment of the invention will next be described which is executed by the computer 12 in order to control the control system, which influences the test-environment parameters, and an addressable component of the microscope system. In the case of the exemplary method that is represented in FIG. 6, the addressable component of the microscope system is a recording device, such as a camera for example. Firstly, in step 61 the temporal recording-intervals in which the camera has to make recordings of the specimen material in the test chamber are entered into the computer 12 by a user. Furthermore, the user defines an experimental schedule—i.e. for example, a fixed set of test-environment parameters or typically the temporal change in various test-environment parameters during the experiment. The experimental schedule can be input in any suitable manner that is expedient and convenient for the user, for example by the user specifying that a particular test-environment parameter is to increase in linear manner from a first value to a second value within a predetermined time-interval, or that the test-environment parameter is to assume a new value abruptly at particular times. On the basis of the experimental schedule input by the user and on the basis of the recording-interval, in step 62 the computer generates a time-phased schedule which contains the times $st_i$ at which a control command for one of the control modules is to be generated in order to bring about a change in the corresponding test-environment parameter, and also the times $mt_j$ at which the camera of the microscope system has to be driven in order to record an image. The following steps 63-67 are repeated until the experiment is terminated by a renewed user input or until a predetermined maximum experiment-time has been reached. Firstly, in step 63 a time t elapsed since the start of the experiment is registered, for example on the basis of the system time of the computer 12. Subsequently, in step 64 it is ascertained whether the current time t is equal to one of the previously ascertained times $st_i$ at which one of the control modules is to be controlled. If this is the case, in step 65 a corresponding module control command is generated and output to the bus 13. As has already been explained earlier, the module control command may contain, in particular, address information relating to the identification of the control module that is to be controlled by the command. Subsequently, in step 66, it is ascertained whether the current time t is equal to one of the times $mt_j$ at which the addressable component—i.e. in this case, the camera—of the microscope system has to be controlled or actuated. If this is the case, in step 67 a microscope control command is next generated. As has likewise already been discussed above, the microscope control command may also contain address information, on the basis of which the addressable component of the microscope system is identified. Subsequently steps 63-67 are repeated.

It is evident that the exemplary method 60 shown in FIG. 6 includes only fundamental control functions for the control system for influencing test-environment parameters and the addressable component of the microscope system. Further functions may, however, be easily integrated into the method. Functions of such a type may, for example, include an automatic storage of recorded images, possibly supplemented by the simultaneous storage of additional information, such as the current time at the time of the recording, or current test-environment parameters, or the logging and/or evaluation of test-environment-parameter values.

Whereas, in the exemplary embodiments previously discussed in detail where the microscope system respectively has only one addressable component, a plurality of addressable components of the microscope system may also be controlled together with the control system via a unified bus system. Similarly, as discussed in the preceding exemplary embodiments, the bus system does not have to include a plurality of control modules, but may also be a single control module. In this case the individual control module and the addressable component of the microscope system can also be controlled using the method described with reference to FIG. 6.

Whereas exemplary embodiments of the present invention have been described above with reference to a microscope arrangement, the control modules and the control system for influencing test-environment parameters may find application not only in microscope arrangements but generally in any incubation system.

Summing up, according to exemplary embodiments of the present invention a control module for influencing a test-environment parameter of an incubation system, a control system for influencing a plurality of test-environment parameters, a method of controlling a microscope arrangement with a control system and a computer-program product are provided which enable a simplified data communication between the various components involved, using a unified bus system, and consequently provide a user-friendly, unified control of the various components under an operator interface by means of a computer system.

The invention claimed is:

1. A control module for influencing a test environment parameter of a single incubation system, comprising:
a control command interface unit configured to receive at least one control command, said control command interface unit configured to couple with a bus;
a control device coupled with said control command interface unit and configured to influence the test-environment parameter based upon said at least one control command;
a further interface unit coupled to said control command interface unit and configured to output again, from said control module, in identical form said at least one control command that has been received;
an air outlet emitting air to be conducted into a test environment;
an air inlet receiving the air to be conducted into the test environment;
a conduit communicating air from said air inlet to said air outlet; and
a housing having sides, said air inlet and said air outlet being disposed on opposing ones of said sides to enable stacking of said control module with another control module such that said control module, together with the other control module, is operable to influence different test environment parameters by influencing the same air flow, said control command interface being disposed on one of said opposing sides on which one of said air inlet and air outlet are provided, and said further interface unit being disposed on the other one of said opposing sides on which one of said air inlet and said air outlet are provided, one of said control command interface and said further interface unit being disposed on the opposing side having said air outlet from which air influenced as a result of the at least one control command is emitted.

2. The control module according to claim 1, wherein said control device is configured to evaluate said at least one control command and ascertain whether or not said at least one control command is addressed to said control device.

3. The control module according to claim 1, wherein said control device:
is configured to evaluate said at least one control command to ascertain a set value for the test-environment parameter; and
has a memory configured to store said set value.

4. The control module according to claim 3, further comprising a sensor port for receiving an actual value of the test-environment parameter from a sensor, said control device being configured to store said actual value in said memory.

5. The control module according to claim 4, wherein said control device is configured to output said actual value through said control command interface unit.

6. The control module according to claim 1, wherein:
said air inlet and said air outlet each include a connecting portion; and
said connecting portions are configured in complementary manner.

7. The control module according to claim 1, wherein:
said control command interface unit is disposed on a first side of said housing;
said further interface unit is disposed on an opposing second side of said housing;
wherein said air inlet is disposed on said first side; and
wherein said air outlet is disposed on said second side.

8. The control module according to claim 1, wherein:
said control command interface unit has a connecting portion;
said further interface unit has a further connecting portion;
said connecting portion and said further connecting portion are configured in complementary manner.

9. The control module according to claim 1, wherein the test-environment parameter is selected from a specimen-holder temperature, an air temperature, an air humidity, an air carbon-dioxide content, and an air oxygen content.

10. The control module according to claim 1, further comprising an air-influencing device affecting the test-environment parameter by influencing the passing through said air outlet.

11. A control system for influencing a plurality of test-environment parameters of a single incubation system, comprising:
a bus configured to transmit at least one control command; and
a plurality of control modules each having:
an interface unit coupled to said bus to receive said at least one control command from said bus;
a control device coupled to said interface unit and configured to influence at least one of a plurality of test-environment parameters based upon said at least one control command;
an air outlet emitting air to be conducted into a test environment and configured to influence said at least one of said plurality of test-environment parameters by influencing the air;
an air inlet receiving the air to be conducted into the test environment, and
a conduit communicating air from said air inlet to said air outlet;
at least one of said plurality of control modules having a housing with sides, said air inlet and said air outlet of said at least one of said plurality of control modules being disposed on opposing ones of said sides to enable stacking of said control module with another of said plurality of control modules such that said control module, together with the other control module, is operable to influence different test-environment parameters by influencing the same air flow, said at least one of said plurality of control modules having a further interface unit coupled to said interface unit and configured to output again, from said at least one control module, said at least one control command that has been received, said interface unit being disposed on one of said opposing sides on which one of said air inlet and said air outlet are provided, and said further interface unit being disposed on the other one of said opposing sides on which one of said air inlet and said air outlet are provided, one of said interface unit and said further interface unit being disposed on the opposing side having said air outlet from which air influenced as a result of the at least one control command is emitted.

12. The control system according to claim 11, wherein said control device of each of said control modules is configured to evaluate respectively said at least one control command and to ascertain whether or not said at least one control command is addressed to an evaluating one of said control modules.

13. The control system according to claim 11, wherein:
a first control module of said plurality of control modules has a first further interface unit; and
a portion of said bus is guided from said interface unit of said first control module through said first control module to said first further interface unit.

14. The control system according to claim 13, wherein said first further interface unit is electrically coupled with said interface unit of one of said control modules different from said first control module.

15. The control system according to claim 14, wherein:
said first control module has a first side face;
said different control module has a second side face; and
said first control module and said different one of said control modules are configured to electrically couple said further interface unit of said first control module with said interface unit of said different control module when said first side face of said first control module is brought into contact with said second side face of said different control module.

16. The control system according to claim 15, wherein:
said air outlet of said first control module is sealingly connected to said air inlet of said different control module to enable exchange of the air to be conducted into the test environment between said first control module and said different control module when said first side face of said first control module is brought into contact with said second side face of said different control module.

17. The control system according to claim 11, wherein control variables pertaining to said plurality of control modules are different in pairs.

18. The control system according to claim 11, wherein said bus is a serial bus.

19. The control system according to claim 11, wherein said bus has a bus protocol selected from the group of a CAN protocol, an RS232 protocol, and a USB protocol.

20. The control system according to claim 11, wherein each control module of said plurality of control modules has a further interface unit coupled to said interface unit and is configured to output again said at least one control command received.

21. A microscope configuration, comprising:
a microscope system having:
a test chamber having test-environment parameters; and
a microscope configured to observe a specimen in said test chamber; and
a control system configured to influence said test-environment parameters, said control system having:
a bus configured to transmit a control command; and
a plurality of control modules each having:
an interface unit coupled with said bus to receive said control command from said bus;
a control device coupled to said interface unit and configured to influence at least one of said test-environment parameters based upon said control command;
an air outlet emitting air to be conducted into said test chamber and configured to influence said at least one of said test-environment parameters by influencing the air;
an air inlet receiving the air to be conducted into the test chamber; and
a conduit communicating air from said air inlet to said air outlet;
at least one of said plurality of control modules having a housing with sides, said air inlet and said air outlet of said at least one of said plurality of control modules being disposed on opposing ones of said sides to enable stacking of said control module with another of said plurality of control modules such that said control module, together with the other control module, is operable to influence different test-environment parameters by influencing the same air flow, said at least one of said plurality of control modules having a further interface unit coupled to said interface unit and configured to output again, from said at least one control module, said at least one control command that has been received, said interface unit being disposed on one of said opposing sides on which one of said air inlet and said air outlet are provided, and said further interface unit being disposed on the other one of said opposing sides on which one of said air inlet and said air outlet are provided, one of said interface unit and said further interface unit being disposed on the opposing side having said air outlet from which air influenced as a result of the at least one control command is emitted.

22. The microscope configuration according to claim 21, further comprising at least one addressable component coupled with said bus through an interface unit of at least one of said control modules to receive said control command, said addressable component being configured to actuate based upon said control command.

23. The microscope configuration according to claim 22, wherein said addressable component is configured to ascertain whether or not said control command is addressed to said addressable component.

24. The microscope configuration according to claim 21, wherein at least one of said control modules has a suction opening receiving one of fresh air and air from said test chamber.

25. The microscope configuration according to claim 21, wherein an air supply connects at least one of said control modules to said test chamber to conduct air into a test environment.

26. The microscope configuration according to claim 21, further comprising an electronic computer system coupled with said bus and configured to output said control command through said bus.

* * * * *

UNITED STATES PATENT AND TRADEMARK OFFICE
CERTIFICATE OF CORRECTION

| | | |
|---|---|---|
| PATENT NO. | : 8,249,727 B2 | Page 1 of 1 |
| APPLICATION NO. | : 11/857866 | |
| DATED | : August 21, 2012 | |
| INVENTOR(S) | : Jörg Schaffer et al. | |

It is certified that error appears in the above-identified patent and that said Letters Patent is hereby corrected as shown below:

Column 5, after line 62 and before line 63, insert the section heading:
--BRIEF DESCRIPTION OF THE SEVERAL VIEWS OF THE DRAWINGS--

Column 6, after line 13 and before line 14, insert the section heading:
--DETAILED DESCRIPTION OF THE INVENTION--

Column 14, line 49, replace "haying" with --having--

Signed and Sealed this
Sixth Day of November, 2012

David J. Kappos
*Director of the United States Patent and Trademark Office*